United States Patent
R. M. Sales et al.

(10) Patent No.: US 11,327,205 B2
(45) Date of Patent: May 10, 2022

(54) ENCAPSULATED DIFFUSER

(71) Applicant: VIAVI SOLUTIONS INC., San Jose, CA (US)

(72) Inventors: Tasso R. M. Sales, Rochester, NY (US); George Michael Morris, Victor, NY (US)

(73) Assignee: VIAVI SOLUTIONS INC., San Jose, CA (US)

(*) Notice: Subject to any disclaimer, the term of this patent is extended or adjusted under 35 U.S.C. 154(b) by 0 days.

(21) Appl. No.: 16/940,733

(22) Filed: Jul. 28, 2020

(65) Prior Publication Data
US 2021/0033759 A1  Feb. 4, 2021

Related U.S. Application Data (60) Provisional application No. 62/879,860, filed on Jul. 29, 2019.

(51) Int. Cl.
  *G02B 5/02*  (2006.01)

(52) U.S. Cl.
  CPC ......... *G02B 5/0263* (2013.01); *G02B 5/0231* (2013.01)

(58) Field of Classification Search
  None
  See application file for complete search history.

(56) References Cited

U.S. PATENT DOCUMENTS

| | | | |
|---|---|---|---|
| 2003/0147140 A1* | 8/2003 | Ito | G02B 5/0278 359/599 |
| 2004/0079114 A1* | 4/2004 | Aitken | C03B 11/086 65/64 |
| 2012/0155093 A1 | 6/2012 | Yamada et al. | |
| 2012/0328829 A1* | 12/2012 | Vang | B82Y 30/00 428/141 |
| 2014/0374731 A1* | 12/2014 | Kim | H01L 51/5234 257/40 |
| 2017/0307790 A1 | 10/2017 | Bellman et al. | |
| 2018/0081093 A1 | 3/2018 | Wang et al. | |
| 2018/0136370 A1* | 5/2018 | Busse | C03C 25/68 |
| 2019/0187341 A1 | 6/2019 | Chakmakjian et al. | |

FOREIGN PATENT DOCUMENTS

| | | |
|---|---|---|
| CN | 1734291 | 2/2006 |
| CN | 101874213 | 10/2010 |
| CN | 103154780 | 6/2013 |
| CN | 105182455 | 12/2015 |
| CN | 105612436 | 5/2016 |
| CN | 107144896 | 9/2017 |
| EP | 0634445 | 1/1995 |
| KR | 10-20040089084 | 10/2004 |
| KR | 10-2010041974 | 4/2010 |
| WO | 2014/183993 | 11/2014 |

* cited by examiner

*Primary Examiner* — Derek S. Chapel
(74) *Attorney, Agent, or Firm* — Mannava & Kang, P. C.

(57) ABSTRACT

An optical device, such as a diffuser, can include a substrate; and a diffuser surface, in which the diffuser surface has an index of refraction greater than about 1.8. A method of making and using the optical device is also disclosed.

16 Claims, 6 Drawing Sheets

ENCAPSULATED DIFFUSER

RELATED APPLICATION

The present application claims priority to U.S. Provisional Patent Application No. 62/879,860, filed Jul. 29, 2019, the entire disclosure of which is hereby incorporated by reference.

FIELD OF THE INVENTION

The present disclosure generally relates to an optical device, such as a diffuser, including a substrate; and a diffuser surface; wherein the diffuser surface has an index of refraction greater than about 1.8, for example from about 1.8 to about 4.5. Methods of making and using the optical device are disclosed herein.

BACKGROUND OF THE INVENTION

Diffusers can take a variety of forms such as diffractive diffusers, and Gaussian diffusers. Microlens arrays can also be utilized for diffusion purposes.

Figure 1:
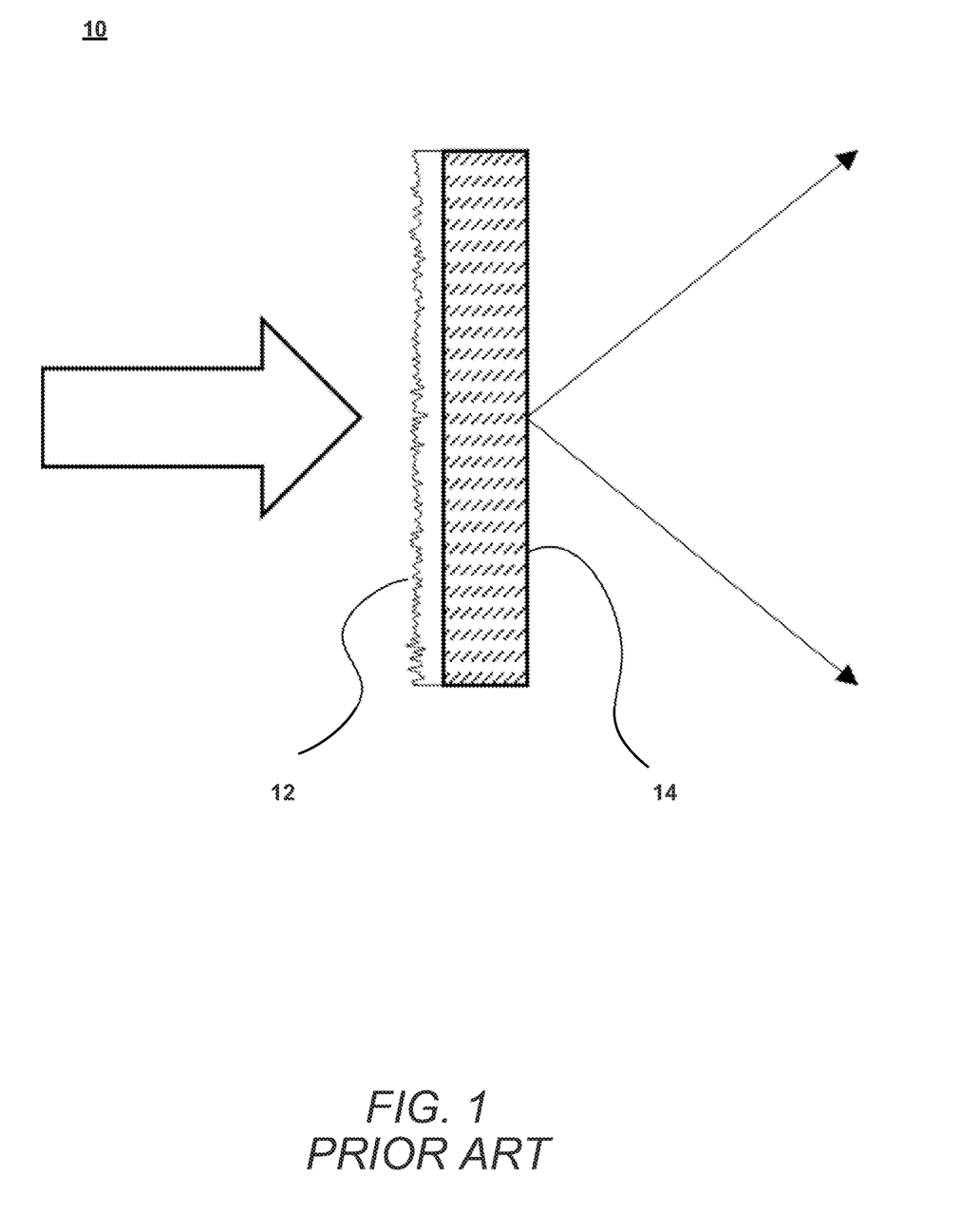
FIG. 1 is a schematic of an optical device according to the prior art.

The prototypical optical diffuser 10 includes a substrate 14 and the diffuser surface 12. The diffuser surface 12 contains the diffuser pattern itself. As indicated in FIG. 1, the mode of operation is such that an incident beam illuminates the diffuser surface 12, which then spreads the beam away from the substrate 14 side in accordance with the properties of the diffuser 10.

There are some applications, such as those related to three-dimensional (3D) imaging, sensing, and gesture recognition, where the diffuser is used to spread a laser beam directed towards the user who is sometimes looking directly towards the source/diffuser. Ordinarily, the high-power density of the directed laser would likely cause damage to the user's eye. However, the diffuser being in the path of the laser, it spreads the beam into a significantly wider angular spread that reduces the amount of radiation reaching the user's eye to such a degree as not to inflict any damage. This, of course, is true as long as there is no damage or contamination to the diffuser surface so as to allow a significant portion of concentrated radiation to be transmitted unimpeded through the diffuser, also referred to as a "hot spot".

Two primary sources of damage that can lead to hot spots are physical damage and contamination. Physical damage means direct damage to the diffuser surface where the diffuser structure is directly damaged or deformed to such an extent that one or multiple hot spots has been produced. Contamination can take several forms. The most severe and significant form happens when foreign material comes in contact with the diffuser surface and remains present long enough to generate a hot spot while the device that houses the diffuser is in use, thus posing an eye-safety threat. The main mechanism at play here is one of index-matching. If some foreign material comes in contact with the diffuser with an index of refraction that is close to that of the diffuser surface then, effectively, there is no diffuser surface and the input beam propagates substantially unimpeded leading to a hot spot. Typical examples of this type of contamination would include immersing the diffuser into a fluid, such as water or oils. The index of refraction of common fluids is usually in the range of 1.3 to 1.7, while the index of refraction of typical diffuser materials is in the range of 1.45 to 1.6 so that the chance of index-matching in case of contact can be significant.

What is needed is an optical device, such as a diffuser, that includes materials that are less likely to produce hot spots due to physical damage and/or contamination.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed an optical device, such as a diffuser, including a substrate; and a diffuser surface; wherein the diffuser surface has an index of refraction greater than about 1.8.

In another aspect, there is disclosed a method of making an optical device, comprising providing a substrate; and providing a diffuser surface on the substrate; wherein the diffuser surface has an index of refraction greater than about 1.8.

In another aspect, there is disclosed a method of using an optical device, comprising illuminating the optical device with input illumination, wherein the optical device includes a substrate; and a diffuser surface; wherein the diffuser surface has an index of refraction greater than about 1.8.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are optical devices; and a method of making and using optical devices.

The present invention discloses an optical device, such as a diffuser, that can be configured to help minimize the chance of damage and/or contamination by careful selection of materials or encapsulation of the diffuser surface of the optical device. In such a manner, the diffuser surface can be isolated from the environment thus reducing the chances the optical device could become damaged or contaminated. Such a concept can be useful in applications where the chance of damage or contamination needs to be significantly minimized. In particular, damage and/or contamination can be minimized and/or eliminated by inhibiting direct access to the diffuser surface of the optical device.

Figure 2:
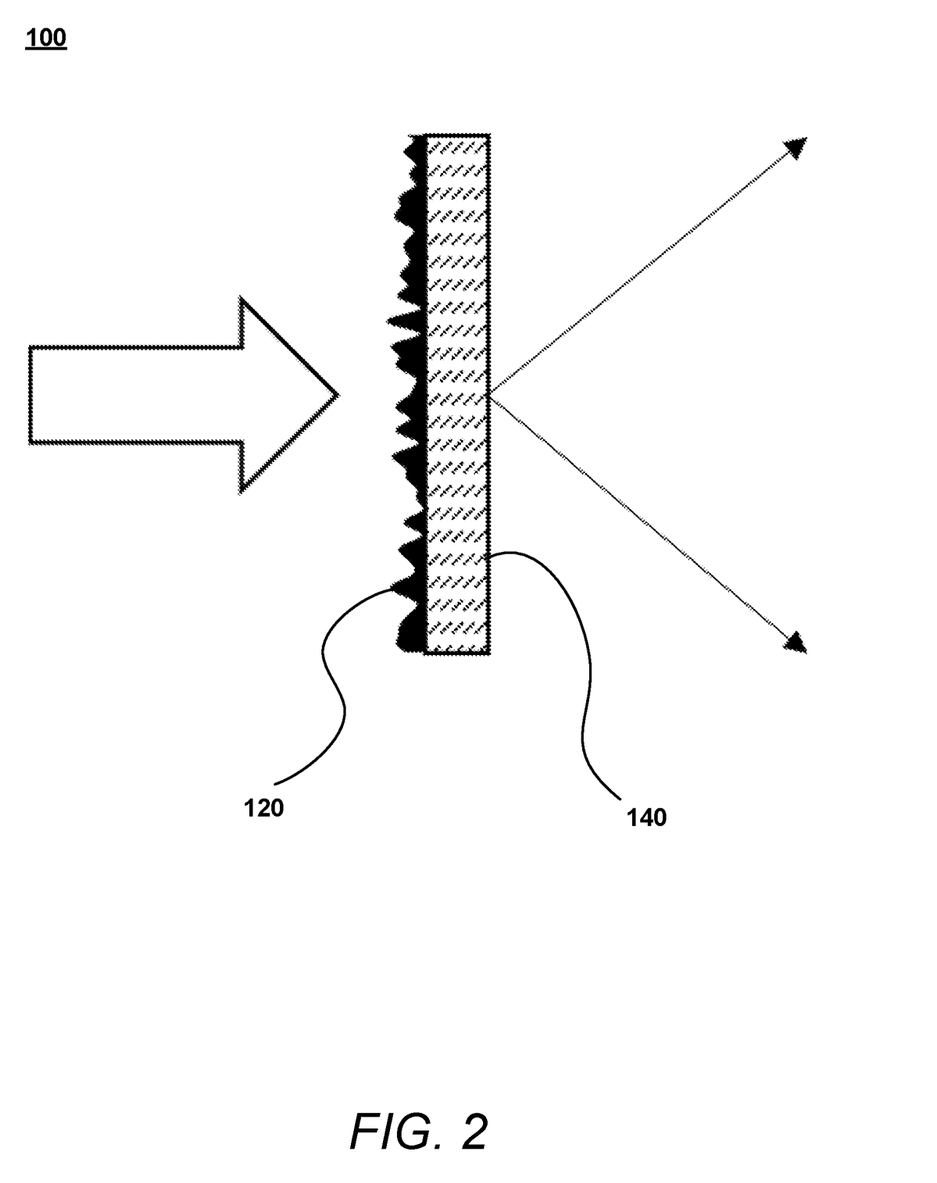
FIG. 2 is a schematic of an optical device according to an aspect of the invention.

As shown in FIG. 2, the optical device 100, such as a diffuser, can include a substrate 140; and a diffuser surface 120; wherein the diffuser surface has an index of refraction greater than about 1.8, for example from about 1.8 to about 4.5. In an aspect, to lessen the impact of contamination by index-matching, the diffuser surface 120 of the optical device 100 can comprise a material with a high index of refraction, such that contamination by contact with fluids, such as water or oil, does not lead to hot spots. The index of refraction of the diffuser surface 120 of the optical device 100 should be higher than that of a contaminating material. A typical contaminating material can have an index of refraction in the range of about 1.3 to about 1.7. The disclosed diffuser surface 120 can have an index of refraction greater than about 1.8, for example from about 1.8 to about 4.5 to avoid index-matching with a contaminating material. The index of refraction of the optical device can range from about 1.8 to about 4.3, for example, from about 2.0 to about 4.1, and as a further example, from about 2.2 to about 4.0.

The optical device 100 can be made from any material that is transparent to input illumination. Non-limiting examples of transparent materials include plastics, glass, diamond, fused silica, and amorphous silicon. The substrate 140 and the diffuser surface 120 can each be independently made from the transparent materials.

The optical device 100 can be monolithic, i.e., the substrate 140 and the diffuser surface 120, on whose surface a diffuser pattern is created, are from the same material. The diffuser surface 120 can be created by methods such as embossing, molding, or reactive-ion etching. Non-limiting examples of monolithic materials include silicon and germanium.

The optical device 100 can be formed of different materials. In particular, the diffuser surface 120 and the substrate 140 can include different materials. In the case where the substrate 140 and diffuser surface 120 are comprised of different materials, the diffuser surface 120 can generally be produced by replication methods.

The diffuser surface 120 can have a physical thickness greater than 0 nm, i.e., it is not just a planar surface of the substrate 140. For example, the diffuser surface 120 can have a physical thickness sufficient to include a depth of a microstructure. The diffuser surface 120 can have a physical thickness from about 1 nm to about 300 nm, for example, from about 3 nm to about 250 nm, and as a further example from about 10 nm to about 200 nm, including all ranges and sub-ranges in between.

The diffuser surface 120 can include a high refractive index material, for example, having a refractive index greater than about 1.8. The high refractive index material can be a hydride, a nitride, a carbide, or a metal oxide. Non-limiting examples of a high refractive index material include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($EU_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), silicon hydride (SiH), selenium trioxide ($Se_2O_3$), tin oxide ($SnO_2$), tungsten trioxide ($WO_3$), combinations thereof, and the like. In an aspect, the diffuser surface 120 can include silicon hydride.

The diffuser surface 120 can include a high refractive index material and one or more other materials. The high refractive index material can be present in the diffuser surface 120 in a major amount, i.e., 50% or greater, relative to the total amount of the diffuser surface 120. The other material can be present in the diffuser surface 120 in a minor amount, i.e., less than 50%, relative to the total amount of the diffuser surface 120. In an aspect, the diffuser surface 120 can include a high refractive index material and trace amounts of various elements, and/or compounds. As an example, the diffuser surface 120 can include silicon hydride and at least one other material chosen from nitrogen, oxygen, silicon hydroxide, niobium pentoxide ($Nb_2O_5$), niobium titanium oxide ($NbTiO_x$) wherein x is an integer from 1 to 6, and SiC:H. In particular, the diffuser surface 120 can include silicon hydride, nitrogen, and oxygen. The diffuser surface 120 can include silicon hydride and trace amounts of one or more other materials chosen from nitrogen, oxygen, silicon hydroxide, and silicon carbide doped with hydrogen (SiC:H).

The diffuser surface 120 can contain the diffuser pattern itself. In an aspect, the diffuser surface 120 can be etched. The substrate 140 can exert no optical function and can primarily serve to provide mechanical support to the optical device 100.

Figure 3:
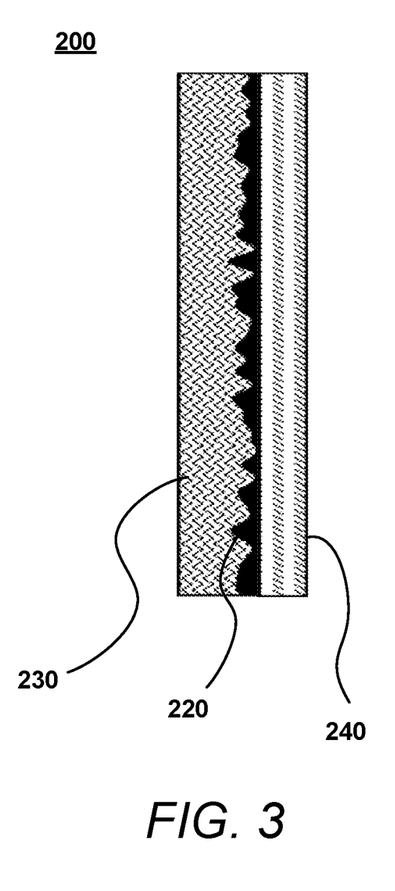
FIG. 3 is a schematic of an optical device according to another aspect of the invention.

FIG. 3 illustrates an optical device 200, such as a diffuser, including a substrate 240; a diffuser surface 220; and an encapsulating layer 230 that encapsulates the diffuser surface 220. The optical device 200 can have an index of refraction greater than about 2.2. The substrate 240 and the encapsulating layer 230 can each independently include a planar external surface. A planarization step can be performed to obtain a planar external surface. In this manner, the optical device 200 can be immune to index matching by a contaminating material. Additionally, the diffuser surface 220 is not exposed to the environment, thereby inhibiting direct physical damage. To be clear, the planar external surfaces of the substrate 240 and the encapsulating layer 230 can be physically damaged, but the physical damage would not affect the performance of the optical device 200.

The optical device 200 can have an index contrast Δ>0.25, for example from about 0.25 to about 500, and as a further example from about 0.5 to about 450, and as a further example, from about 0.75 to about 400. If the index of refraction of the optical device 200 is represented by $n_D$ and the encapsulating layer 230 is represented by $n_C$, the basic requirement for the optical device 200 to operate properly is that the index contrast $\Delta=n_D-n_C$ is sufficiently large. The exact magnitude of the contrast depends on the specific optical device 200 requirements. In many cases, an index contrast Δ>0.25 can be sufficient to enable a significant range of optical device requirements.

Materials for the encapsulating layer 230 can be the same or different from the materials used for the diffuser surface 220 and/or the substrate 240. In an aspect, the material for the encapsulating layer 230 can be a transparent material such as glass, a polymer, etc. The material can be selected to provide the requisite index contrast. As an example, an optical device 200 whose diffuser surface 220 is comprised of diamond, which has an index of refraction of about 2.4, can have an encapsulating layer 230 comprised of a polymer with an index of refraction of about 1.56. In this case, the index contrast is about 0.8, which easily exceeds the 0.25 minimum.

Figure 4:
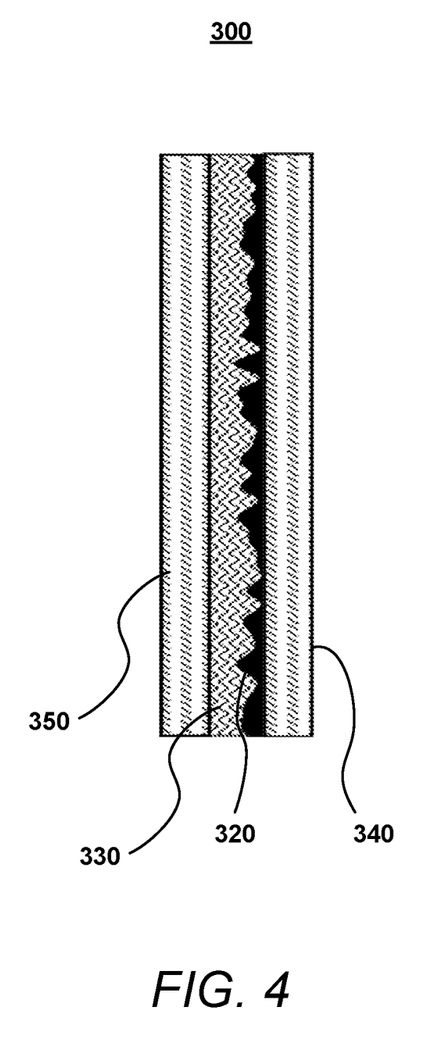
FIG. 4 is a schematic of an optical device according to another aspect of the invention.

FIG. 4 illustrates an optical device 300, such as a diffuser, including a substrate 340; a diffuser surface 320; and a cover layer 350. The cover layer 350 can also include a planar external surface. The cover layer 350 can protect an encapsulating layer 330. The cover layer 350 can be any transparent material, such as glass. The cover layer 350 can improve reliability to variations in the environment, such as variations in humidity and/or temperature. The materials for use in the substrate 340, diffuser surface 320, encapsulating layer 330, and cover layer 350 are the same as those discussed above with regard to the substrate 140 and diffuser surface 120.

Figure 5:
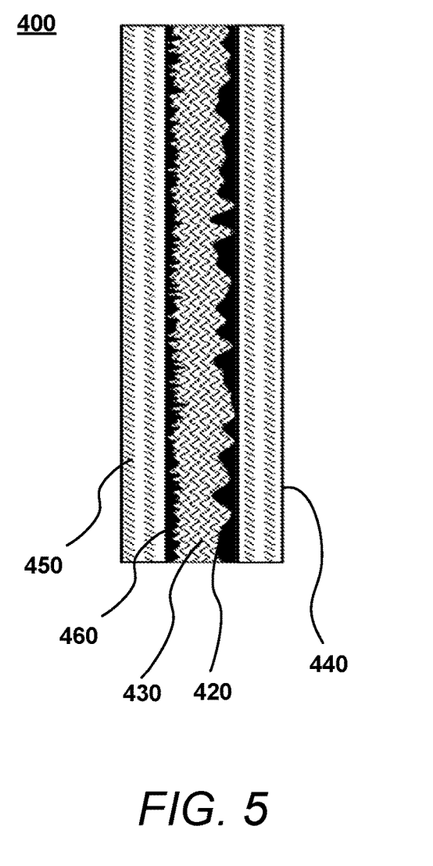
FIG. 5 is a schematic of an optical device according to another aspect of the invention.

FIG. 5 illustrates an optical device 400, such as a diffuser, including a substrate 440; a first diffuser surface 420; and a second diffuser surface 460. The optical device 400 can include an encapsulating layer 430, and a cover layer 450. The cover layer 450 can also include an external planar surface. The cover layer 450 can protect the encapsulating layer 430. Each of the first diffuser surface 420 and the second diffuser surface 460 can independently be encapsulated. In an aspect, an optical device 400 with multiple diffuser surfaces can be used to provide additional homogenization or increased spread angles not achievable with a single diffuser surface. The materials for use in the substrate 440, first diffuser surface 420, second diffuser surface 460, encapsulating layer 430, and cover layer 450 are the same as those discussed above with regard to the substrate 140 and diffuser surface 120.

Figure 6:
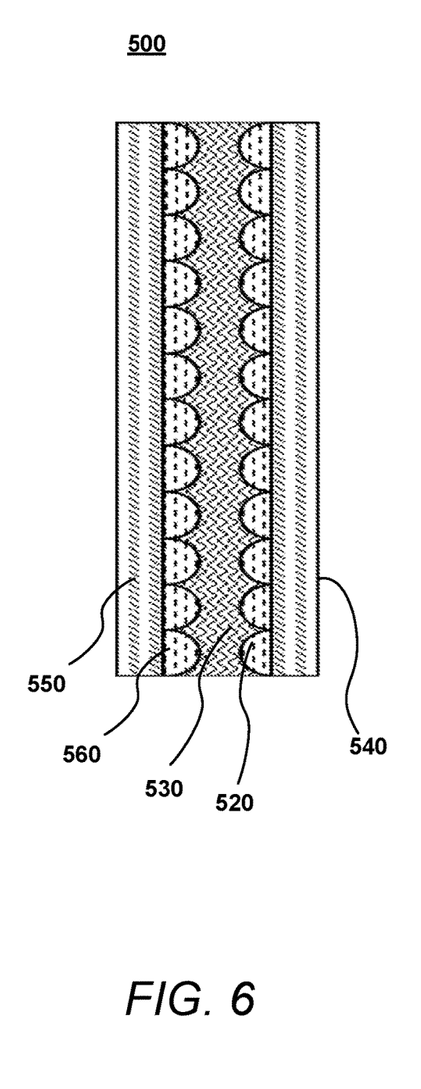
FIG. 6 is a schematic of an optical device according to another aspect of the invention.
Figure 7:
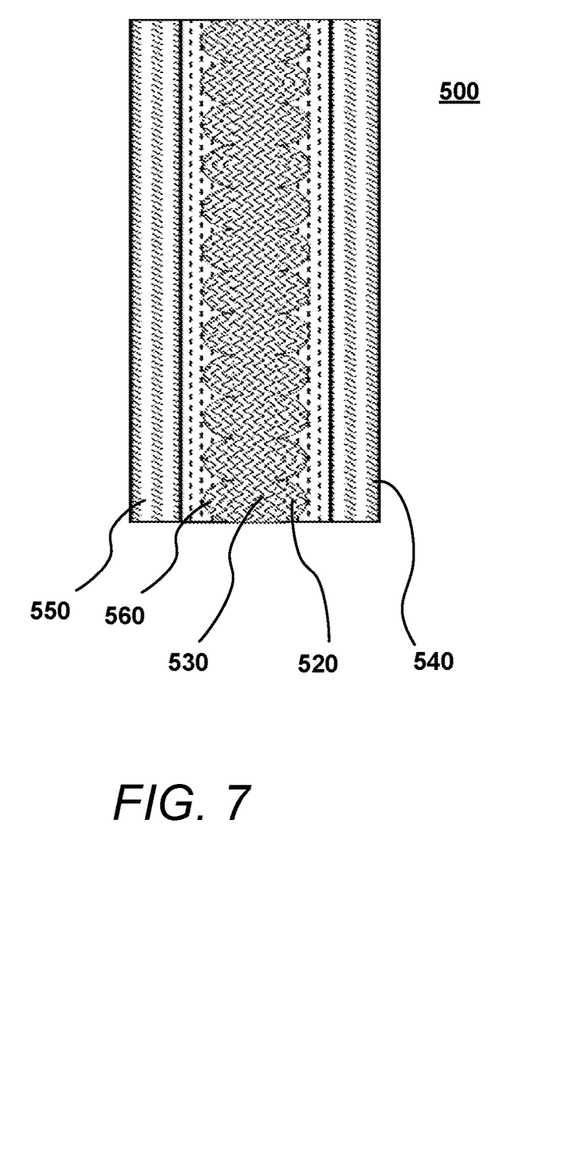
FIG. 7 is a schematic of an optical device according to another aspect of the invention.
Figure 8:
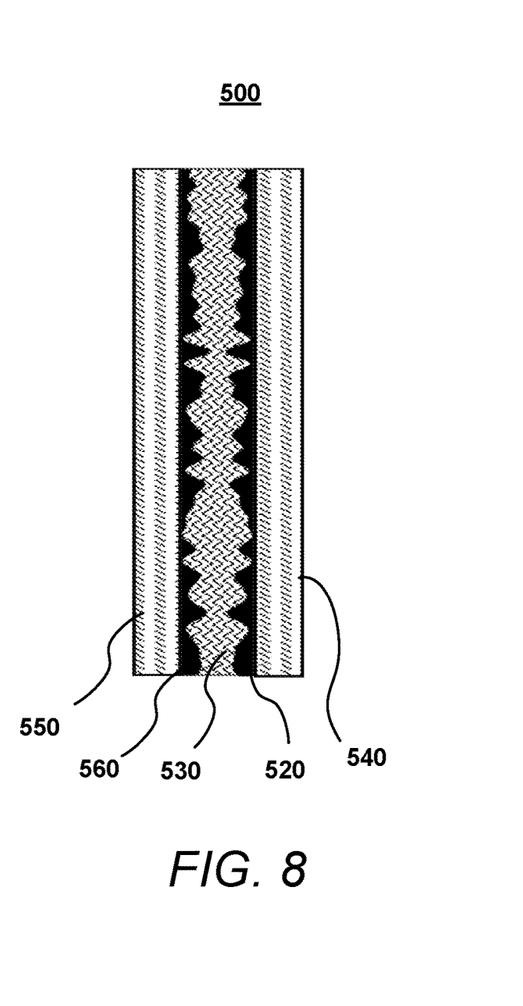
FIG. 8 is a schematic of an optical device according to another aspect of the invention.

FIGS. 6, 7, and 8 illustrate optical devices with multiple diffuser surfaces. In FIGS. 6, 7, and 8, the diffuser surfaces, e.g., the first diffuser surface 520 and the second diffuser surface 560, can take the form of a periodic or random microstructure, such as a plurality of microlenses. The first diffuser surface 520 can be a mirror image of the second diffuser surface 560 with respect to an imaginary plane crossing through the middle of the optical device 500. In the case of FIG. 6 the microstructures are periodic convex microlenses and can be encapsulated. In the case of FIG. 7 the microstructures are periodic concave microlenses and can be encapsulated. In the case of FIG. 8 the microstructures are randomly distributed within each diffuser surface (first diffuser surface 520 and second diffuser surface 560) but still mirror images of each other and can be encapsulated. In yet another particular case of this configuration, the microstructure, periodic or random, are such that microlenses from one side of the optical device 500 focus onto the corresponding microlenses on the other side of the optical device 500.

Figure 9:
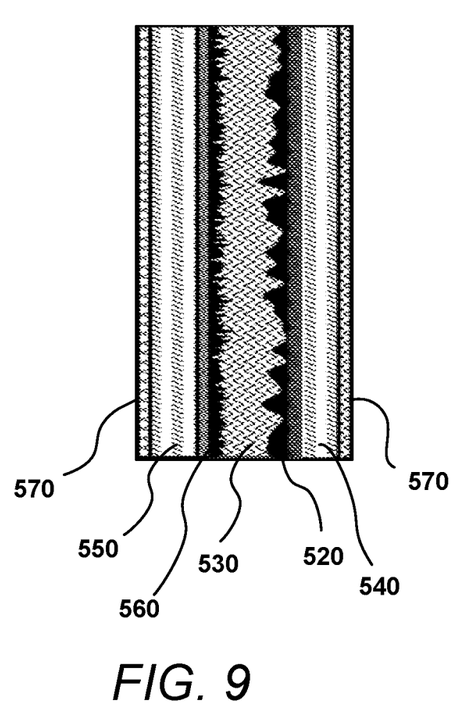
FIG. 9 is a schematic of an optical device according to another aspect of the invention.

Optical transmission through an optical device can be limited by reflection losses at the various interfaces. To improve transmission, at least one anti-reflection layer 570 can be added to the various interfaces in any of the various configurations previously described. For example, FIG. 9 illustrates anti-reflection layers 570 that have been added to the optical device of FIG. 5. In another aspect, the anti-reflection layers 570 can be added directly onto the diffuser surface 520 (and second diffuser surface 560) to maximize the transmitted energy.

There is also disclosed a method of making an optical device, including providing a substrate; and providing a diffuser surface on the substrate, in which the diffuser surface has an index of refraction greater than about 1.8. The substrate and the diffuser surface are as described above with regard to the optical device.

There is also disclosed a method of using an optical device including illuminating the optical device with input illumination, in which the optical device can include a substrate; and a diffuser surface, in which the diffuser surface has an index of refraction greater than about 1.8. The substrate and the diffuser surface are as described above with regard to the optical device.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device comprising:
   a substrate; and
   a diffuser surface, wherein the diffuser surface has an index of refraction greater than about 1.8;

wherein the diffuser surface includes silicon hydride and one or more other materials chosen from nitrogen, silicon hydroxide, niobium pentoxide ($Nb_2O_5$), niobium titanium oxide ($NbTiO_x$) wherein x is an integer from 1 to 6, and SiC:H.

2. The optical device of claim 1, wherein the diffuser surface has an index of refraction from about 1.8 to about 4.5.

3. The optical device of claim 1, wherein the diffuser surface includes a diffuser pattern.

4. The optical device of claim 1, wherein the substrate and the diffuser surface are made from the same material.

5. The optical device of claim 1, wherein the substrate and the diffuser surface are made from different materials.

6. The optical device of claim 1, further comprising an encapsulating layer.

7. The optical device of claim 1, wherein the optical device has an index contrast $\Delta > 0.25$.

8. The optical device of claim 1, further comprising a cover layer.

9. The optical device of claim 1, wherein the diffuser surface includes a first diffuser surface and a second diffuser surface.

10. The optical device of claim 9, wherein the first diffuser surface and the second diffuser surface are each independently encapsulated.

11. The optical device of claim 9, wherein the first diffuser surface and the second diffuser surface are mirror images.

12. The optical device of claim 1, wherein the diffuser surface is a periodic microstructure.

13. The optical device of claim 1, wherein the diffuser surface is a random microstructure.

14. The optical device of claim 1, wherein the diffuser surface is a plurality of microlenses.

15. A method of making an optical device, comprising:
providing a substrate; and
providing a diffuser surface on the substrate;
wherein the diffuser surface has an index of refraction greater than about 1.8;
wherein the diffuser surface includes silicon hydride and one or more other materials chosen from nitrogen, silicon hydroxide, niobium pentoxide ($Nb_2O_5$) niobium titanium oxide ($NbTiO_x$) wherein x is an integer from 1 to 6, and Sic:H.

16. A method of using an optical device, comprising:
illuminating the optical device with input illumination, wherein the optical device includes a substrate; and a diffuser surface; wherein the diffuser surface has an index of refraction greater than about 1.8;
wherein the diffuser surface includes silicon hydride and one or more other materials chosen from nitrogen, silicon hydroxide, niobium pentoxide ($Nb_2O_5$), niobium titanium oxide ($NbTiO_x$) wherein x is an integer from 1 to 6, and SiC:H.

* * * * *